(12) United States Patent
 Amundson

(10) Patent No.: US 11,708,980 B2
(45) Date of Patent: Jul. 25, 2023

(54) HEAT EXCHANGER PROTECTIVE COVER

(71) Applicant: Brock Amundson, East Grand Forks, MN (US)

(72) Inventor: Brock Amundson, East Grand Forks, MN (US)

( * ) Notice: Subject to any disclaimer, the term of this patent is extended or adjusted under 35 U.S.C. 154(b) by 456 days.

(21) Appl. No.: 16/839,046

(22) Filed: Apr. 2, 2020

(65) Prior Publication Data
US 2020/0318838 A1 Oct. 8, 2020

Related U.S. Application Data

(60) Provisional application No. 62/827,949, filed on Apr. 2, 2019.

(51) Int. Cl.
*B01D 46/02* (2006.01)
*F24F 1/58* (2011.01)
(Continued)

(52) U.S. Cl.
CPC ............. *F24F 1/58* (2013.01); *B01D 46/02* (2013.01); *B65D 85/68* (2013.01); *F24F 13/20* (2013.01)

(58) Field of Classification Search
CPC ..... F24F 1/58; F24F 1/56; F24F 13/20; B01D 46/02; B65D 85/68
See application file for complete search history.

(56) References Cited

U.S. PATENT DOCUMENTS 4,475,585 A * 10/1984 Hoeffken ................ F24F 13/20
165/122
4,953,328 A 9/1990 Sewell et al.
(Continued)

FOREIGN PATENT DOCUMENTS

AU 2013209291 A1 5/2014
CN 2558917 Y 7/2003
(Continued)

OTHER PUBLICATIONS

Sturdy Covers; Sturdy Covers AC Defender—Universal Winter Air Conditioner Cover; Online Listing; retrieved Mar. 1, 2019; https://www.amazon.com/Sturdy-Covers-AC-Defender-Conditioner/dp/B01D6R8PU0/; 11 pp.

*Primary Examiner* — Dung H Bui
(74) *Attorney, Agent, or Firm* — Grumbles Law PLLC; Bryan Kravis

(57) ABSTRACT

A protective cover for an external heat exchanger of a heat exchanger such as an air conditioner system or a heat pump system is disclosed. The protective cover includes a continuous loop of screen material and flexible nonporous material. The first end of the screen material and a second end of the screen material are affixed to opposite ends of the flexible nonporous material to form a continuous loop. The continuous loop comprises an upper edge and a lower edge configured to fit over at least a portion of an external heat exchanger having sides, a bottom, and a top, and wherein the continuous loop of screen material covers at least a portion of vent holes on the side of the exchanger. The protective cover includes a top yoke attached to the upper edge of the screen material and the top yoke comprising a cinching mechanism. The top yoke covers at least a portion of the vent holes on the side of the heat exchanger and at least a portion of the top of the external of the exchanger, and the cinching mechanism, when tightened, secures the protective cover to the heat exchanger. A method of installing the disclosed protective cover is also disclosed.

12 Claims, 3 Drawing Sheets

(51) Int. Cl.
   *F24F 13/20* (2006.01)
   *B65D 85/68* (2006.01)

(56) References Cited

U.S. PATENT DOCUMENTS

| | | | | |
|---|---|---|---|---|
| 5,097,678 | A * | 3/1992 | Aubuchon | F24F 1/58 |
| | | | | 62/506 |
| 5,156,662 | A * | 10/1992 | Downing | F24F 13/28 |
| | | | | 55/501 |
| 5,529,593 | A * | 6/1996 | Simmons | F24F 1/0071 |
| | | | | 55/354 |
| 5,809,800 | A * | 9/1998 | Deal | F24F 1/58 |
| | | | | 62/507 |
| 5,950,446 | A | 9/1999 | Tromblee et al. | |
| 6,105,668 | A | 8/2000 | Schwarz et al. | |
| 6,138,993 | A * | 10/2000 | Mitchell, Jr. | E04H 17/163 |
| | | | | 256/25 |
| 6,378,320 | B1 * | 4/2002 | Matambo | F24F 1/22 |
| | | | | 361/807 |
| 6,430,954 | B1 | 8/2002 | Smith | |
| 6,708,514 | B1 * | 3/2004 | Miller | F24F 1/58 |
| | | | | 62/507 |
| 6,764,277 | B2 | 7/2004 | Somahara et al. | |
| 7,059,088 | B2 | 6/2006 | Lattanzio | |
| 7,140,194 | B1 * | 11/2006 | Miller | F24F 1/58 |
| | | | | 62/507 |
| 7,332,011 | B1 * | 2/2008 | Sandberg | B01D 46/0005 |
| | | | | 55/491 |
| 7,387,654 | B1 * | 6/2008 | Byers | B01D 46/10 |
| | | | | 55/501 |
| 7,591,870 | B2 * | 9/2009 | Simmons | F24F 1/50 |
| | | | | 55/491 |
| 7,819,151 | B1 | 10/2010 | Kuhn | |
| 8,454,720 | B1 | 6/2013 | Bond | |
| 8,783,661 | B1 | 7/2014 | Payne | |
| 10,145,570 | B2 * | 12/2018 | Johnson | F24F 1/58 |
| D941,976 | S * | 1/2022 | Klauer | D23/347 |
| 2003/0159450 | A1 | 8/2003 | Yoneno et al. | |
| 2005/0164627 | A1 | 7/2005 | Boone, Jr. | |
| 2007/0163295 | A1 * | 7/2007 | Martin | F24F 1/08 |
| | | | | 62/298 |
| 2007/0272909 | A1 * | 11/2007 | Payne | E04H 17/161 |
| | | | | 256/47 |
| 2008/0307708 | A1 | 12/2008 | Quan | |
| 2009/0114376 | A1 | 5/2009 | Ishida et al. | |
| 2016/0025359 | A1 * | 1/2016 | Maynard | F24F 1/58 |
| | | | | 150/165 |
| 2016/0061483 | A1 * | 3/2016 | DeLano | F24F 1/58 |
| | | | | 55/507 |
| 2016/0097549 | A1 * | 4/2016 | McMahon | F24F 1/58 |
| | | | | 150/154 |

FOREIGN PATENT DOCUMENTS

| | | |
|---|---|---|
| CN | 102538164 A | 7/2012 |
| EP | 3208548 A1 | 8/2017 |
| JP | 2012052754 A | 3/2012 |

* cited by examiner

HEAT EXCHANGER PROTECTIVE COVER

RELATED CASES

This disclosure claims the benefit of U.S. Provisional Pat. App. Ser. No. 62/827,949, that was filed on Apr. 2, 2019 and is herein incorporated by reference in its entirety.

FIELD

This disclosure relates to protective porous covers configured to fit over external components of heat exchangers such as air conditioning or heat pump systems.

BACKGROUND

Many buildings, such as homes and other structures, are heated or cooled by air conditioning systems. These systems utilize at least an interior unit and at least an external unit located in the interior of the building and the exterior of the building respectively. Typically, each of these units is a heat exchanger. In the case of a cooling air conditioning system heat is transferred from the air in the interior of the building and conveyed a heat exchanging medium which it heats up, absorbing the heat from the interior of the building. The heat exchanging medium then is pumped to the external heat exchanger unit in which the heat is transferred back to the ambient air outside of the building. A heat pump works in reverse in that it takes heat from the ambient air outside of the building and transfers it via a heat exchanging medium to the inside air of the building.

In a typical external heat exchanging unit the external heat exchanging unit contains a large surface area, usually in the form of finned tubing or coils that are situated on the periphery of a heat exchanging condenser. A centrally located fan circulates ambient air through the condenser fins or coils giving up or taking up heat from the ambient air. To work efficiently it is important for the air circulating through the condenser heat exchanging parts to allow unrestricted air flow through the whole external unit.

SUMMARY

Typically, the external heat exchanging unit of the heating or cooling unit is usually set external to the building on a concrete pad surrounded by landscaping, lawn, or other vegetation. Every time the lawn is mowed, grass clippings can be blown into the heat exchanger fins. Similarly, dead leaves or other air-borne particles such as seeds, dust, spores, sand, and other debris can clog up or restrict the air flow needed for the heat exchanging unit to operate efficiently. Additionally, the external heat exchanger can be vulnerable to damage from lawn mower, children, pets, toys, or other objects. In some cases, collisions with such objects can bend or deform the heat exchanging fins or coils. Anything that restricts air flow through the external heat exchanger can reduce the efficiency of the unit or damage the unit.

It is known to place the external heat exchanger including the condenser and heat exchanging fins or coils inside of a protective case, such as a metal chassis, that has slots through it to allow relatively free flow of air therethrough. Additionally, protective screens that are adjustable in size can be installed outside of the external heat exchanging unit and can provide protection to the unit. Many of these protective screens require installation by a skilled technician. In addition, there are a number of flexible covers that can be used to protect units during the non-use season (winter for cooling air exchangers or summer for heating air exchangers) that can be installed or removed without the need for a skilled technician. These protective covers do not have structures allowing ambient air to travel through the heat exchanger since they are designed to isolate the unit during the nonuse season. Some protective covers are known that attach to the outside of external heat exchangers or a chassis provided around the outside of a heat exchanger that fit around the sides of the exchanger. In some cases, these protective covers can be tied or clamped, for example, with a bungee cord, to the unit. But such covers may be susceptible to removal by wind, rain, or other outside forces.

There is a need for a protective cover for external heat exchangers that provides protection to the heat exchanger from both small particulates and damaging collisions that is easy to install, resists removal by the elements but still allows free ambient air circulation through the heat exchanger.

In one aspect, a heat-exchanger protective cover is provided that includes a combination of screen material and flexible nonporous joining material. The combination of screen material and flexible nonporous joining material are connected so as to form a continuous loop. The materials in the continuous loop include an upper edge and a lower edge. The continuous loop can be configured to fit over at least a portion of an external heat exchanger that has sides, a bottom, and a top. The continuous loop can cover at least a portion of outlet vents on the side of the heat exchanger. Additionally, the provided protective cover can include a yoke that is attached to the upper edge of the screen material. The yoke can include a cinching mechanism. The yoke also can cover at least a portion of the outlet vents on the side of the heat exchanger and at least a portion of the top side of the external heat exchanger.

In another aspect, a method of protecting a heat exchanger system, such as an air conditioner or a heat pump is provided that includes providing a protective porous cover that includes a yoke with a cinching mechanism that is configured to fit over external components the heat exchanger system, installing the protective porous cover over the external components of the heat exchanger system, and securing the protective cover to the external components of the heat exchanger by tightening the cinching mechanism.

The above summary is not intended to describe each disclosed embodiment of every implementation of the present disclosure. The brief description of the drawings and the detailed description which follow more particularly exemplifies illustrative embodiments.

DETAILED DESCRIPTION

Figure 1:
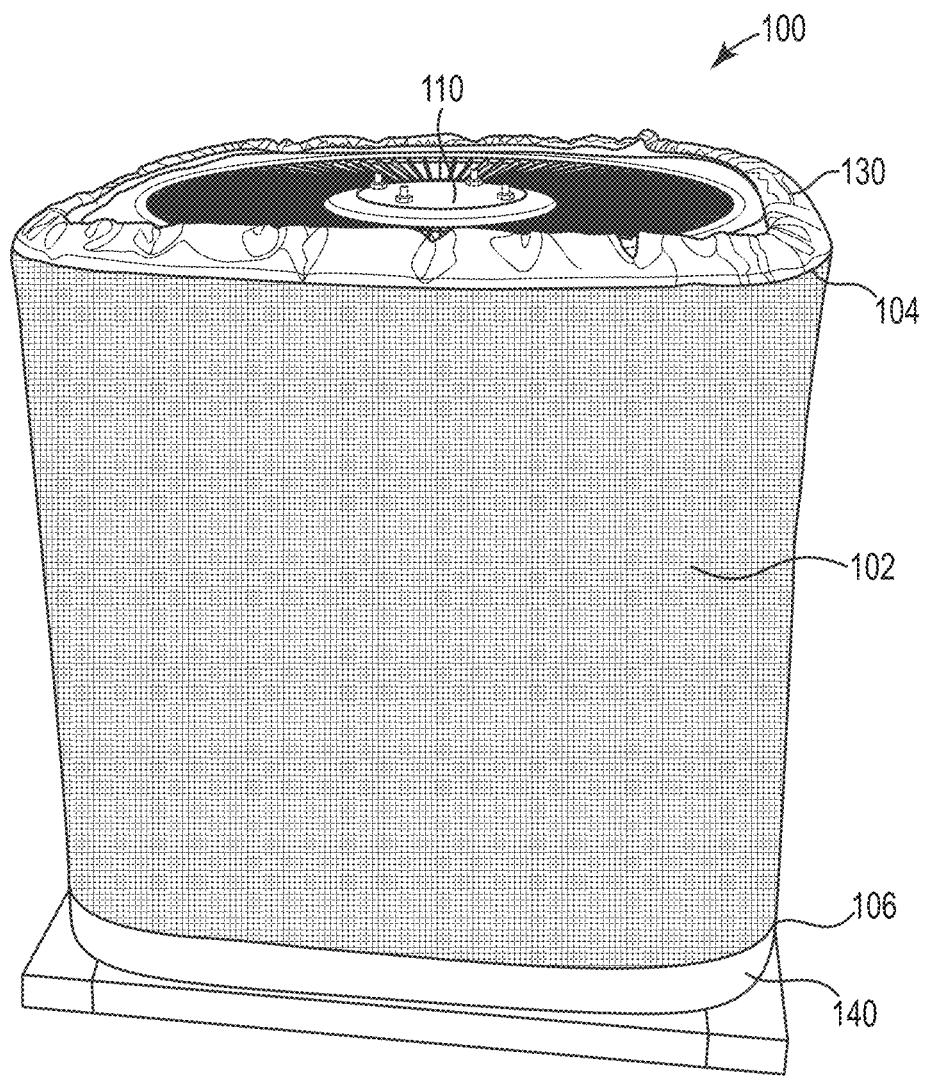
FIG. 1 is a front perspective view of an embodiment of a disclosed cover on an external heat exchanger of a commercial air conditioner unit.

In the following description, reference is made to the accompanying set of drawings that form a part of the description hereof and in which are shown by way of illustration several specific embodiments. It is to be understood that other embodiments are contemplated and may be made without departing from the scope or sprit of the present disclosure. The following detailed description, therefore, is not to be taken in a limiting sense.

Cooling and heating heat exchange systems are commonly used to provide heat or cooling to the inside of buildings such as houses, apartments, office buildings, businesses or any other structures that require air conditioning. Typically, these heat exchange systems have at least three components. A heat-exchange system that can cool the interior of a building includes at least three components—an internal heat exchanger, a heat transfer medium, and an external heat exchanger. When the internal heat exchanger transfers heat from the internal air to a heat transfer medium, such as a compressible liquid. Heat from the internal air is transferred to the compressible liquid which absorbs the heat from the internal air by evaporation of a refrigerant contained in heat transfer coils. The evaporated transfer medium then is conveyed, usually by pumping, to an external heat exchanger outside of the building. There a second heat-exchanger compresses or condenses the evaporated transfer medium and releases heat. In a heating system the functions of the three components is reversed.

The external heat exchanger typically is located outside of the building to be air conditioned but close enough to allow for pipes or hoses that convey the heat transfer medium through the building walls and to the internal heat exchanger. Typically, in a cooling air conditioning system, the evaporated heat transfer medium compresses and transfers heat to ambient air via heat exchanging elements inside of the external heat exchanger. These heat exchanging elements can include coils or fins that heat up from the compressing of the transfer medium. The coils or fins are usually located on the outer edge of the external heat-exchanging unit so that the transfer of heat to the ambient air is facilitated. Usually these units include one or more central fans that enhance the circulation of ambient air though the heated coils or fins.

A typical external heat exchanger can be situated on a concrete pad and should have plenty of space around all of its sides to enhance heat transfer. Some external heat exchangers can be rectangular or square in shape with fins or coils adjacent to each side. Other external heat exchangers can be cylindrical or round with fins or coils completely around the perimeter of the heat exchanger. Other shapes of external heat exchangers are known. But all of them have features that include fins or coils on the exterior part of the heat-exchanger.

Since heat exchange is enhanced by making the fins or coils have a high surface area, the fins or coils are usually small in dimension and need protection from outside elements. Thus, it is typical for an external heat exchanger to be surrounded by a protective cage usually made of metal—that has vent slots or hole in it through which ambient and heated air can freely flow.

The efficiency of external heat exchangers is highest when air can freely flow through the protective cage and contact the fins or coils and then the heated air (in the case of a cooling system) can freely flow back through the protective cage and back to the atmosphere. Debris can accumulate in the vent holes or on the fins or coils during the use of the heating or cooling system that can decrease the efficiency of heat transfer. Additionally, the protective cage can provide mechanical protection to the heat exchanger fins and coils from collisions with, for example, lawn mowers, lawn edgers, toys, or other objects, small debris such as lawn clippings, dirt, sticks, needles, or other small materials that can block the vent holes thereby restricting free air flow through the external heat exchanger.

A heat-exchanger protective cover is described herein. The heat-exchanger protective cover can be useful for protection of the external heat exchanger from debris. The provided protective cover includes screen material having a first end and a second end. The first end and the second end of the screen material can be joined by at least one of a piece of flexible nonporous material to form a continuous loop. The continuous loop can include the screen material and the flexible nonporous material. The heat exchanger protective cover may have an upper edge and a lower edge. In some embodiment, the continuous loop of screen material and flexible nonporous material can be permanently affixed by joining the first end of the screen material with a first edge of the flexible nonporous material and the second end of a second opposite edge of the nonporous material together using wire, brads, clips, adhesives, or other joining devices or materials. In other embodiments, the screen material and the nonporous flexible material can be formed into a continuous loop using a joining fastener such as a zipper or button clasps. The provided protective cover can be configured to fit over at least a portion of vent holes on the protective cage of the external heat exchanger. Typically, the protective cover can fit over a majority or even all of the vent holes that are a part of a protective cage surrounding the external heat exchanger. Typically, the screen material can be wide enough to span the width of the top of the external heat exchanger to the bottom of the heat exchanger.

Useful screen material can include a wide variety of materials. For example, screen material that is used for windows or doors of buildings can be useful in the disclosed protective cover. These screens can be made of, for example, metal such as aluminum, copper, brass, or stainless steel, fiberglass, nylon or other durable polymers such as durable vinyl-coated polyester. The mesh in the screens can range from about 4 mesh (four little squares across one lineal inch of screen) to about 100 mesh. In some embodiments the hole in the mesh can be hexagonal, square, rectangular, or round. Any screen material that allows free air flow therethrough and can trap typical external debris will work.

Typically, screen material is made on a roll with various widths. Useful widths of screen material for the provided protective covers can be from about 0.25 m to about 2.0 m depending upon the height of the protective cage that include vent holes. Other widths may also be useful depending upon the situation of use. Typically, the width of the screen can match the distance from the top to the bottom of the external heat exchanger. Useful flexible nonporous material can include canvas or polymer-infused canvas.

In some embodiments, the flexible nonporous material can cover exposed electrical connections on the external heat exchanger. The nonporous material may not have the same width as the screen material when forming a continuous loop. In some embodiments, there may be a gap or vent hole in the protective cover formed when the flexible nonporous material is less wide than the protective screen material to which it is attached to form a continuous loop. The vent hole can be useful for the through passage of mechanical connections of, for example, hoses or pipes that can be attached to the external heat exchanger.

The provided protective cover also can include a top yoke that is attached to the upper edge of the screen material. The top yoke can be made of a strong and relatively nonporous material such as vinyl, rubber, polyester, canvas, polymer-coated canvas, and can be permanently attached to the upper edge of the continuous loop of screen material and is configured to cover at least a portion of the upper edge of the continuous loop of screen material. In addition, the top yoke covers at least a portion of the top of the external heat exchanger. The top yoke thus covers at least a portion of the side of the external heat exchanger and a portion of the top of the external heat exchanger. In this positioning, the top yoke provides reinforcement to the protective cover as it typically is bent over the junction of the side of the external heat exchanger and the top of the external heat exchanger.

The top yoke can include a cinching mechanism. The top yoke can form a continuous loop at the top edge of the protective cover. It may be attached to the top of the screen material and/or continue across the vent hole portion of the protective cover and join to the other side of the screen material when the screen material is not continuous and the flexible nonporous material has a shorter dimension and does not span the full width of the screen material. In one embodiment, the cinching mechanism can gather the top portion of the yoke that covers at least a portion of the top of the external heat exchanger. The cinching mechanism can include a drawstring, an elastic cord, a bungee cord, a rope or any other feature that draws the top of the continuous loop of screening material together such that an opening left at the top of the gathered yoke is smaller in dimension than the dimensions of the top of the external heat exchanger. The cinching mechanism, when tightened, can secure the protective cover to the heat exchanger.

In some embodiments, an additional yoke (bottom yoke) or reinforcing material is contemplated that is attached to the lower edge of the continuous loop of screen material. This bottom yoke can also provide reinforcement to the stresses of bending over the junction of the sides of the external heat exchanger and at least a portion of the bottom. It can also be gathered using a drawstring, nylon cord, elastic band or other cinching mechanisms configured to draw the bottom yoke together and tighten its fit over the bottom of the external heat exchanger. In some embodiments, the continuous loop of screen material can have an opening through it to allow pipes and/or tubes that carry refrigerant (heat transfer medium) to or from the internal heat exchanger and the external heat exchanger.

Figure 2:
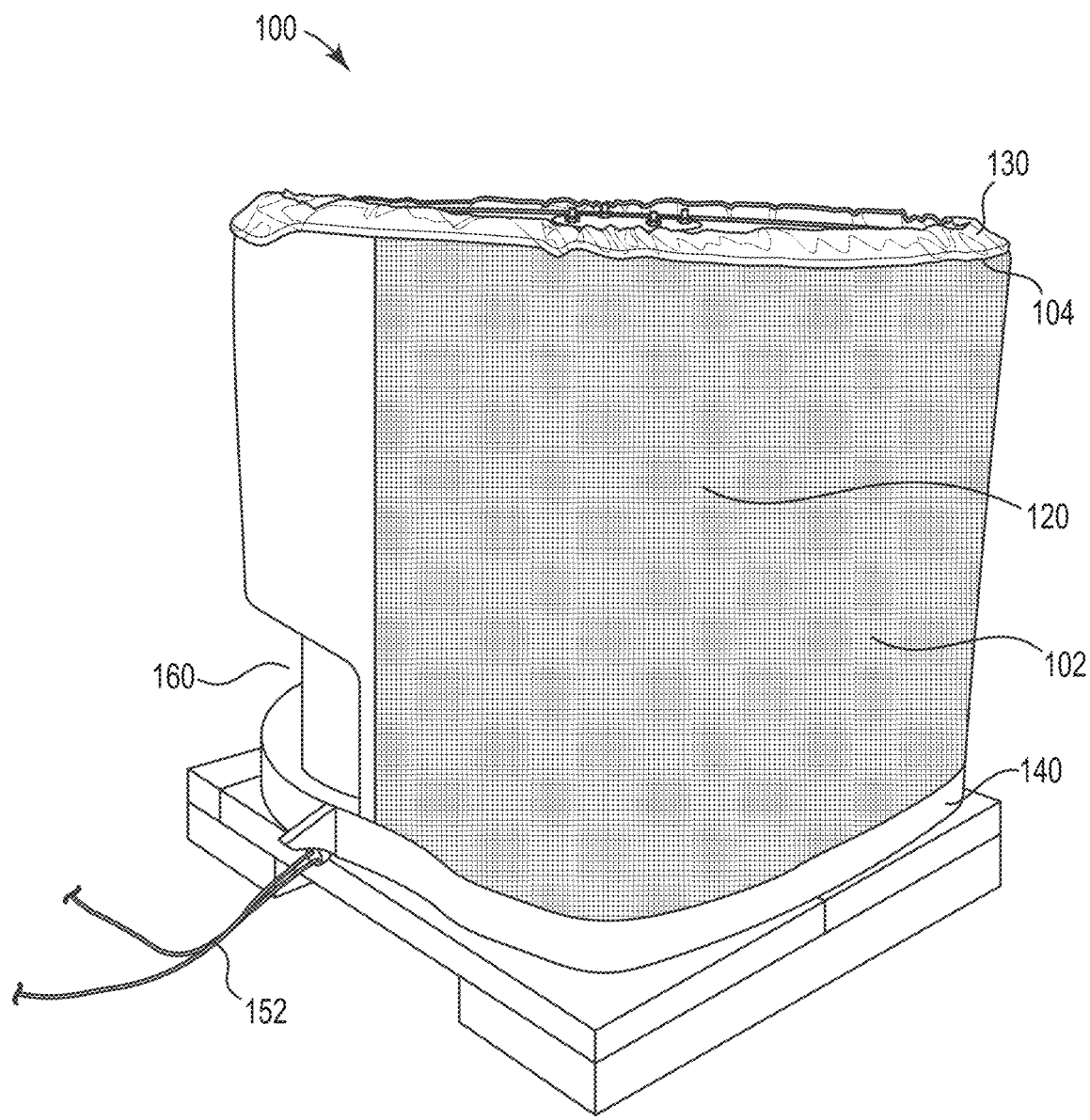
FIG. 2 is a side perspective view of an embodiment of a disclosed cover on an external heat exchanger of a commercial air conditioner unit.
Figure 3:
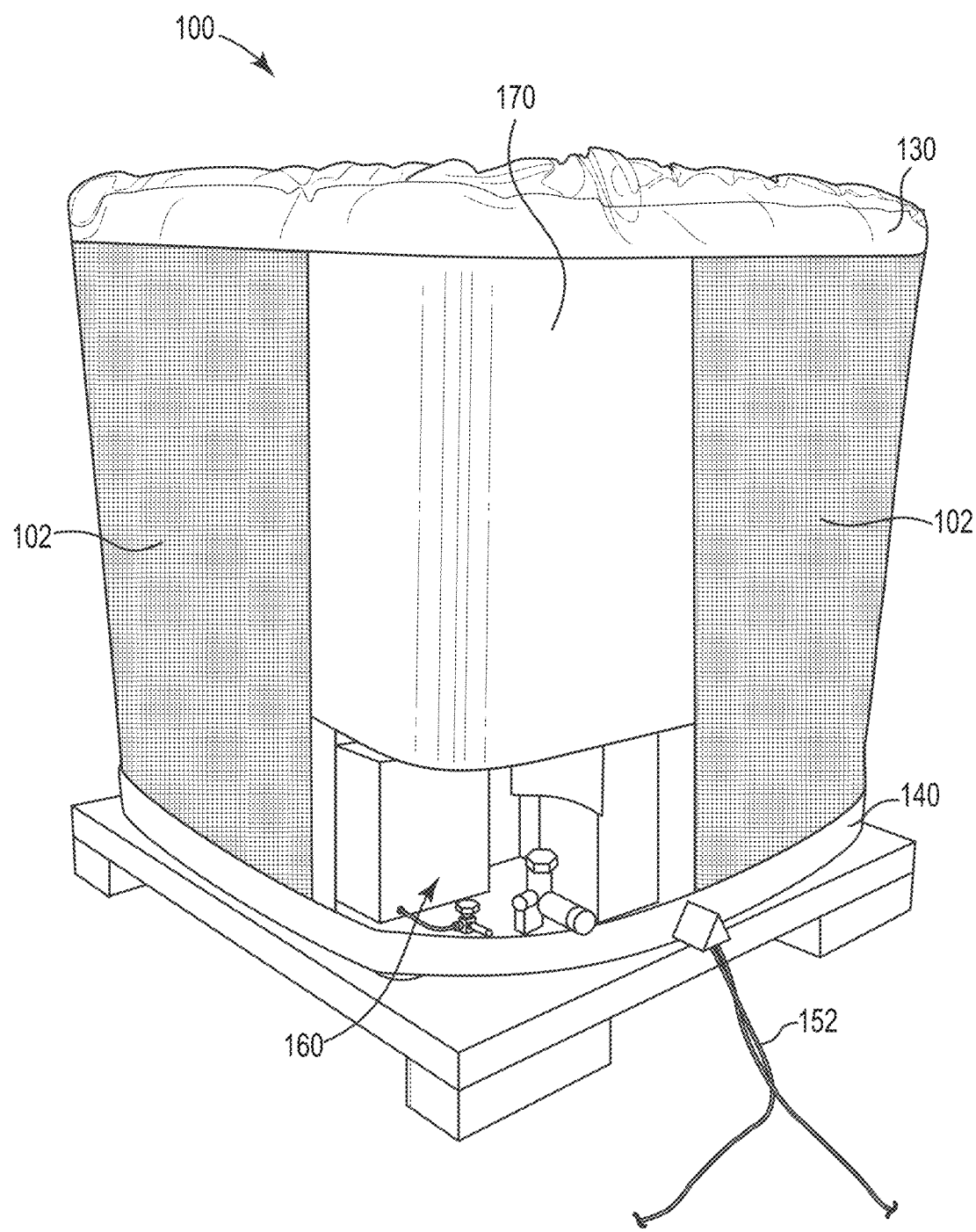
FIG. 3 is a perspective rear view of an embodiment of a disclosed cover on an external heat exchanger of a commercial air conditioning unit.

Turning now to the FIGS. 1-3. FIG. 1 is a front view of an embodiment of a disclosed cover on an external heat exchanger of a commercial air conditioner unit. FIG. 1 shows heat exchanger protective cover 100 installed on external heat exchanger 110 (only top of external heat exchanger is visible). Heat exchanger protective cover 100 includes continuous loop of screen material 102 having two ends, wherein the two ends are each attached to opposite ends of flexible nonporous material 170. Screen material 102 has upper edge 104 and lower edge 106 that is configured to fit over external heat exchanger 110. Screen material 102 covers at least a portion of vent holes 120 that are partially visible through screen material 102 on FIG. 2. Top yoke 130 is attached to upper edge of screen material 104. Top yoke 130 includes cinching mechanism 150 (not visible), but cinching mechanism 152 of bottom yoke 140 is shown and called out. Opening 160 is visible in FIGS. 2 and 3 and allows pipes and hoses to be attached to external heat exchanger 110.

FIG. 3 is a perspective rear view of an embodiment of a disclosed cover on an external heat exchanger of a commercial air conditioning unit. In this view protective cover 100 forms a continuous loop that can at least partially enclose the external heat exchanger. In this view, the continuous loop (forming protective cover 100) includes screen material 102 that encircles the external heat exchanger. The continuous loop also includes flexible nonporous material 170 that is affixed on each end to the two different ends of screen material 102. In the embodiment illustrated in FIG. 3, flexible nonporous material 170 is not as wide as the width of screen material 102 and, consequently, leaves vent hole 160 allowing outside access to hoses and pipes that connect to the external heat exchanger. Also shown are top yoke 130 and bottom yoke 140. In this view, a cinching mechanism 152 is shown. Cinching mechanism 152 is threaded through bottom yoke 140 and encircles protective cover 100. Cinching mechanism 152 can be tightened to hold bottom yoke 140 (and thus, protective cover 100) tightly around the external heat exchanger. Top yoke 130 also has a cinching mechanism that may be the same or a different one from that in bottom yoke 140.

Various modifications and alterations to this disclosure will become apparent to those skilled in the art without departing from the scope and spirit of this disclosure. It should be understood that this disclosure is not intended to be unduly limited by the illustrative embodiments set forth herein and that such embodiments are presented by way of example only with the scope of the disclosure intended to be limited only by the claims set forth herein as follows. All references cited in this disclosure are herein incorporated by reference in their entirety.

What is claimed:

1. A heat-exchanger protective cover comprising:
    a continuous closed loop of screen material and flexible nonporous material;
    wherein a first end of the screen material and a second end of the screen material are affixed to opposite ends of the flexible nonporous material to form the continuous closed loop, and
    wherein the continuous closed loop comprises an upper edge and a lower edge configured to fit over at least a portion of an external heat exchanger having sides, a bottom, and a top, and
    wherein the continuous closed loop of screen material covers at least a portion of vent holes on the side of the external heat exchanger;
    a top yoke comprised of a nonporous material, and attached to the upper edge of the screen material, the top yoke further comprising a cinching mechanism;
    wherein the top yoke covers at least a portion of the vent holes on the side of the heat exchanger and at least a portion of the top of the external heat exchanger, and
    wherein the cinching mechanism, when tightened, secures the protective cover to the external heat exchanger.

2. A heat-exchanger protective cover according to claim 1, further comprising a bottom yoke attached to the lower edge of the screen material.

3. A heat-exchanger protective cover according to claim 2, wherein the bottom yoke comprises a cinching mechanism.

4. A heat-exchanger protective cover according to claim 1, wherein the first end of the screen material is affixed to a first side of a flexible porous material and the second end of the screen material is affixed to a second, opposite side of the flexible porous material.

5. A heat-exchanger protective cover according to claim 4, wherein the screen material and the flexible porous material are permanently affixed to each other.

6. A heat-exchanger protective cover according to claim 1, wherein the screen material comprises aluminum, copper, brass, stainless steel, fiberglass, nylon, or vinyl-coated polyester.

7. A heat-exchanger protective cover according to claim 6, wherein the screen material has openings that range from about 4 mesh to about 100 mesh.

8. A heat-exchanger protective cover according to claim 1, wherein the cover comprises a vent hole.

9. The heat-exchanger protective cover according to claim 1, wherein the top yoke forms a continuous closed loop at the top edge of the protective cover.

10. The heat-exchanger protective cover according to claim 1, wherein the continuous loop further comprises a vent hole gap within the flexible nonporous material.

11. The heat-exchanger protective cover according to claim 1, wherein the continuous closed loop is structured and configured to slide over the top of the external heat exchanger and envelope the external heat exchanger.

12. A method of protecting a heat exchanger system comprising:
  providing a protective porous cover comprising:
    a continuous closed loop of screen material and flexible nonporous material;
      wherein the continuous closed loop comprises an upper edge and a lower edge configured to fit over at least a portion of a heat exchanger, and further wherein the continuous closed loop of screen material is configured to cover at least a portion of vent holes on a side of the heat exchanger; and
    a top yoke comprised of a nonporous material, and attached to the upper edge of the screen material, wherein the top yoke further comprises a cinching mechanism;
  installing the protective porous cover over the external components of the heat exchanger system; and
  securing the protective cover to the external components of the heat exchanger by tightening the cinching mechanism, wherein the top yoke covers at least a portion of a top of the heat exchanger.

* * * * *